US011614536B2

(12) United States Patent
Kondo et al.

(10) Patent No.: US 11,614,536 B2
(45) Date of Patent: Mar. 28, 2023

(54) OBJECT DETECTION APPARATUS BASED ON SCORING RELIABILITY AND INCREASING RELATIVE RANGE RATE

(71) Applicant: DENSO CORPORATION, Kariya (JP)

(72) Inventors: Katsuhiko Kondo, Nisshin (JP); Yusuke Akamine, Nisshin (JP); Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 411 days.

(21) Appl. No.: 16/851,952

(22) Filed: Apr. 17, 2020

(65) Prior Publication Data

US 2020/0241131 A1   Jul. 30, 2020

Related U.S. Application Data

(63) Continuation of application No. PCT/JP2018/038697, filed on Oct. 17, 2018.

(30) Foreign Application Priority Data

Oct. 20, 2017 (JP) .............................. JP2017-203493

(51) Int. Cl.
  *G01S 13/931*   (2020.01)
  *G01S 13/86*    (2006.01)
  *B60W 40/02*    (2006.01)

(52) U.S. Cl.
  CPC .......... *G01S 13/931* (2013.01); *B60W 40/02* (2013.01); *G01S 13/865* (2013.01)

(58) Field of Classification Search
  CPC ........ G01S 13/931; G01S 13/865; G01S 7/41; G01S 7/4802; G01S 7/539; G01S 13/723;
  (Continued)

(56) References Cited

U.S. PATENT DOCUMENTS

2011/0025548 A1* 2/2011 Nickolaou .............. G01S 13/72
                                                          342/52
2014/0145871 A1* 5/2014 Asanuma .............. G01S 13/723
                                                          342/128
(Continued)

FOREIGN PATENT DOCUMENTS

JP    2000199788 A     7/2000
JP    2000285400 A    10/2000
(Continued)

*Primary Examiner* — Donald H B Braswell
(74) *Attorney, Agent, or Firm* — Maschoff Brennan

(57) ABSTRACT

An object detection apparatus detects a target object present in a periphery of a moving body. The object detection apparatus derives recognition information indicating a state of a target object, and predicts a state of the target object at a next second observation timing, based on the recognition information derived at a first observation timing. The object detection apparatus derives a score based on a degree of difference between a state of the target object observed at the second observation timing and a next state of the target object predicted at the first observation timing. The object detection apparatus derives a reliability level by statistically processing scores related to the target object derived at a plurality of observation timings from past to present. In response to the reliability level satisfying a predetermined reference, the object detection apparatus determines that the target object related to the reliability level is actually present.

18 Claims, 10 Drawing Sheets

(58) Field of Classification Search
CPC ...... G01S 13/862; G01S 13/867; G01S 15/66;
G01S 15/931; G01S 17/66; G01S 17/86;
G01S 17/931; G01S 2013/9323; G01S
2013/9324; B60W 40/02; G08G 1/16
See application file for complete search history.

(56) References Cited

U.S. PATENT DOCUMENTS

| | | |
|---|---|---|
| 2015/0321699 A1 | 11/2015 | Rebhan et al. |
| 2016/0116586 A1* | 4/2016 | Fukuman ............... G08G 1/166 367/99 |
| 2017/0101092 A1 | 4/2017 | Nguyen Van et al. |
| 2017/0217395 A1* | 8/2017 | Baba .................... B60W 30/08 |
| 2017/0363737 A1* | 12/2017 | Kaino .................. G01S 13/345 |
| 2018/0374352 A1* | 12/2018 | Matsunaga ....... B60W 30/0956 |

FOREIGN PATENT DOCUMENTS

| | | |
|---|---|---|
| JP | 2006099715 A | 4/2006 |
| JP | 2007022471 A | 2/2007 |
| JP | 3903856 B2 | 4/2007 |
| JP | 2009075650 A | 4/2009 |
| JP | 2013092983 A | 5/2013 |
| JP | 2014067276 A | 4/2014 |

\* cited by examiner

| THRESHOLD(Dr+Dv) | SCORE |
|---|---|
| Th_a=(0~)2 | 3(±α) |
| Th_b=(2~)4 | 2(±α) |
| Th_c=(4~)8 | 1(±α) |
| Th_d=(8~)12 | 0(±α) |
| Th_e=(12~) | -1(±α) |

FIG.7
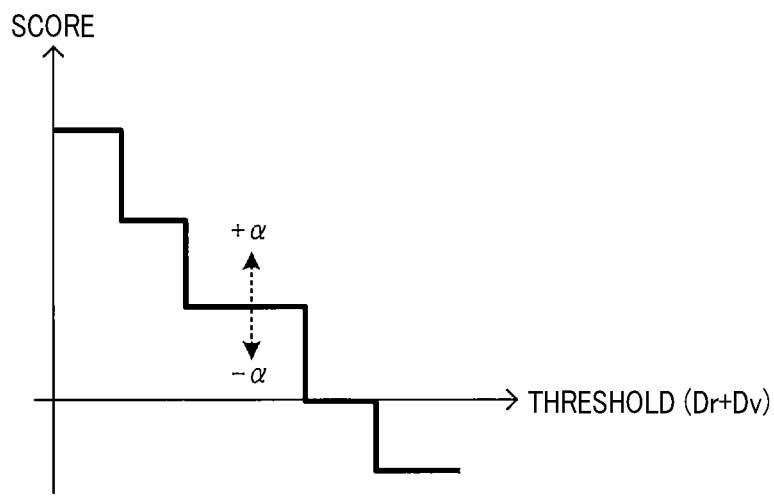
FIG.8
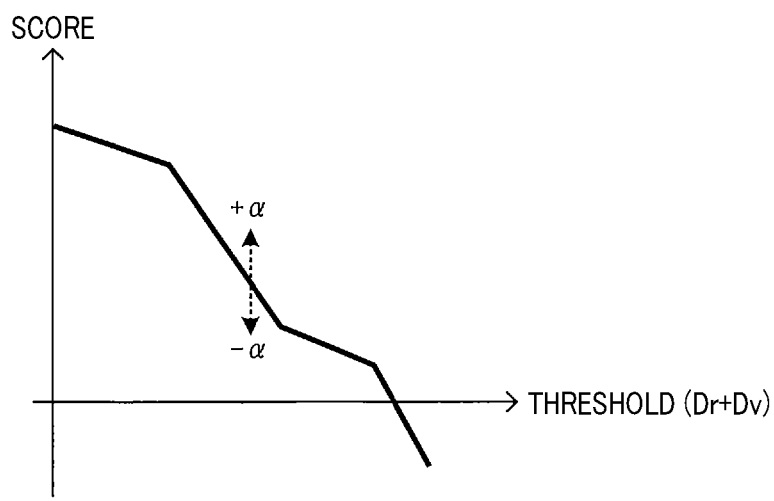
FIG.9
$Sc = -0.2 \times (Dr+Dv) + 2(\pm \alpha)$

FIG.14
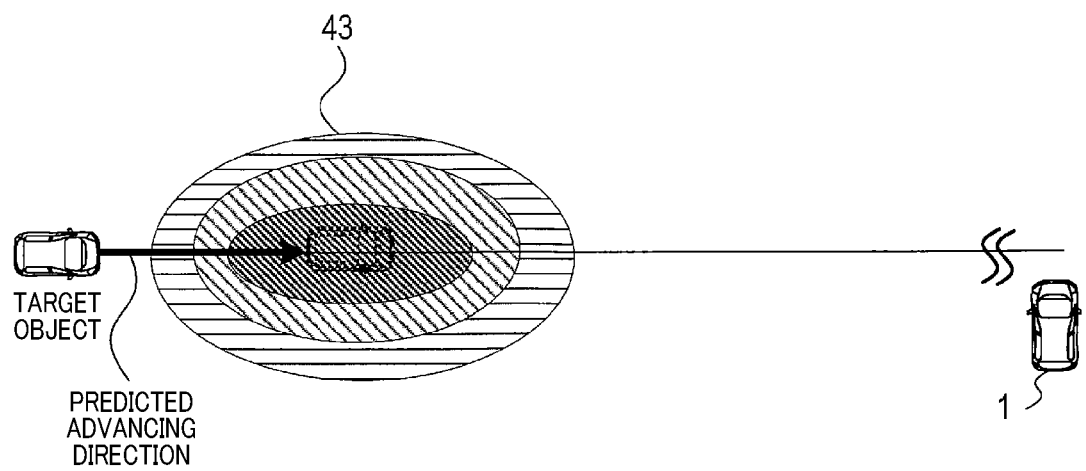
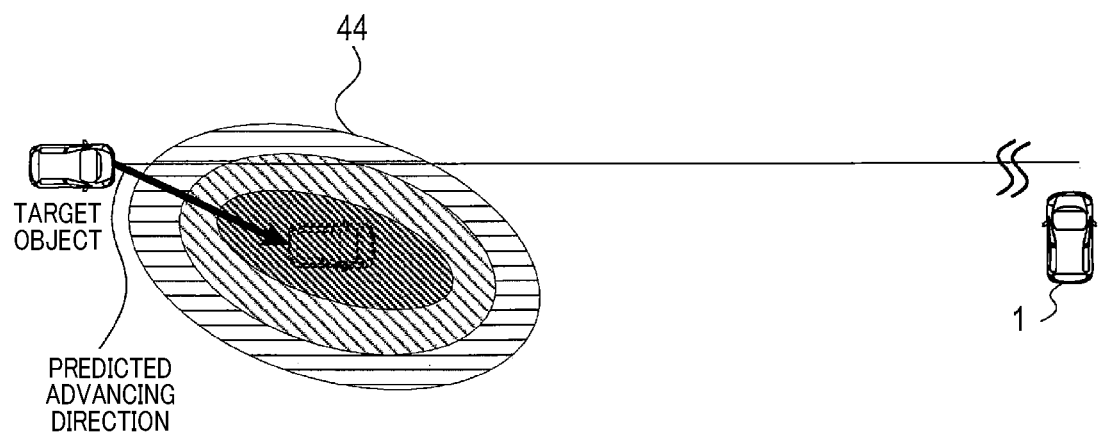

OBJECT DETECTION APPARATUS BASED ON SCORING RELIABILITY AND INCREASING RELATIVE RANGE RATE

CROSS-REFERENCE TO RELATED APPLICATIONS

The present application is a continuation application of International Application No. PCT/JP2018/038697, filed Oct. 17, 2018, which claims priority to Japanese Patent Application No. 2017-203493, filed Oct. 20, 2017. The contents of these applications are incorporated herein by reference in their entirety.

BACKGROUND

Technical Field

The present disclosure relates to an object detection apparatus.

Related Art

A known object detection apparatus uses a reliability level of a detection result of a target object detected by a sensor. Based on the reliability level, the object detection apparatus determines the detection result of the target object.

SUMMARY

An aspect of the present disclosure provides an object detection apparatus that detects a target object present in a periphery of a moving body. The object detection apparatus derives recognition information indicating a state of a target object. The object detection apparatus predicts a state of the target object at a next second observation timing, based on the recognition information derived at a first observation timing. The object detection apparatus derives a score based on a degree of difference between a state of the target object observed at the second observation timing and a next state of the target object predicted at the first observation timing. The object detection apparatus derives a reliability level by statistically processing scores related to the target object derived at a plurality of observation timings from past to present. In response to the reliability level satisfying a predetermined reference, the object detection apparatus determines that the target object related to the reliability level is actually present.

BRIEF DESCRIPTION OF THE DRAWINGS

In the accompanying drawings:

FIG. 7 is an example of a graph defining a score distribution;

FIG. 8 is an example of a graph defining a score distribution;

FIG. 9 is an example of a function defining a score distribution;

FIG. 14 is an explanatory diagram of score distribution according to another embodiment.

DESCRIPTION OF THE EMBODIMENTS

Figure 1:
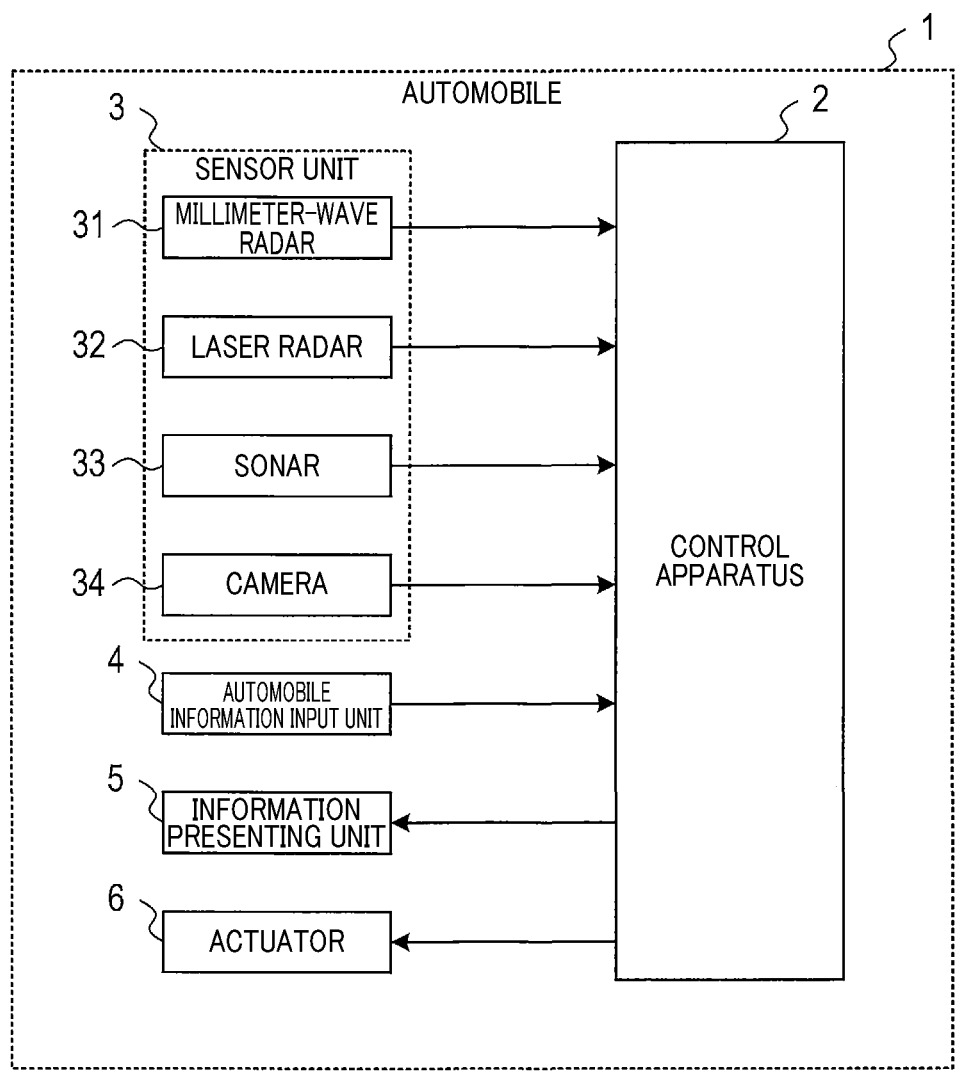
FIG. 1 is a block diagram of an overall configuration of an onboard system according to an embodiment.

The present disclosure relates to an object detection apparatus that, based on a reliability level of a detection result of a target object detected by a sensor, determines the detection result of the target object.

JP-B2-3903856 describes a technology in which, based on a reliability level that indicates a degree of certainty that a target object that is detected by a radar sensor is actually present, control content of an own vehicle relative to the target object is changed. Specifically, the reliability level is calculated at each timing at which the target object is observed by the radar sensor, based on an amount of deviation between a predicted position of the target object that is predicted at a previous observation and a position at which the target object is actually observed.

However, in the aspect of calculating the reliability level of the detected target object, the technology described in JP-B2-3903856 takes into consideration only the observation result at each individual observation timing, and information of past observation results are not reflected in the reliability level. Therefore, as a result of detailed review by the inventors, an issue has been found in that the technology described in JP-B2-3903856 is unable to suppress uncertainty that is attributed to variations in the observation results at the individual observation timings, and a delay in a determination timing of the detection result and erroneous detection may occur.

It is thus desired to provide an object detection apparatus that is capable of determining a detection result at an early stage and improving accuracy of the determination by calculating a reliability level of the detection result of a target object according to an aspect that takes into consideration a reliability level of a past detection result of the target object.

An exemplary embodiment of the present disclosure provides an object detection apparatus that includes an information acquiring unit, a target object recognizing unit, a predicting unit, a score deriving unit, a reliability level deriving unit, and a determining unit.

The information acquiring unit acquires sensor information at each periodic observation timing. The sensor information indicates an observation result from a sensor unit that includes at least a single sensor that observes a state in a predetermined area in the periphery of a moving body.

The predicting unit derives prediction information based on the recognition information derived by the target object recognizing unit. The prediction information is information predicting a state including at least either of a position and a speed of the target object at a next second observation timing based on the recognition information derived at a first observation timing.

The score deriving unit derives a score that indicates a degree of certainty of a detection result of the target object at the second observation timing. The score deriving unit derives the score based on a degree of difference between the state of the target object indicated by the recognition information derived at the second observation timing and the state of the target object indicated by the prediction information related to the second observation timing derived by the predicting unit.

The reliability level deriving unit derives a reliability level that indicates a degree of certainty that target objects, which are recognized by the target object recognizing unit at a plurality of observation timings from past to present and can be considered to be the same, are actually present. The reliability level deriving unit derives the reliability level by statistically processing the scores related to the target object derived by the score deriving unit at the plurality of observation timings. In response to the reliability level derived by the reliability level deriving unit satisfying a predetermined reference, the determining unit determines that the target object related to the reliability level is actually present.

As a result of a configuration such as that described above, based on the statistics of the scores evaluating the observation results of the target object from past to present, the reliability level that indicates the certainty that the observed target object is actually present can be derived. As a result of the reliability level being derived in this manner, uncertainty attributed to variations in the observation result at each observation timing is suppressed. As a result, the detection result of the target object can be early determined and accuracy of the determination can be improved.

An embodiment of the present disclosure will hereinafter be described with reference to the drawings. Here, the present disclosure is not limited to the embodiment below. Various embodiments are possible.

[Description of a Configuration of an Onboard System]

A configuration of an onboard system according to the embodiment will be described with reference to FIG. 1 and FIG. 2. As shown in an example in FIG. 1, the onboard system is mounted in a vehicle 1. According to the present embodiment, for example, the vehicle 1 is an automobile that travels on a road. The vehicle 1 corresponds to a moving body of the present disclosure. Here, the moving body of the present disclosure may be a vehicle other than the vehicle. As shown in the example in FIG. 1, the onboard system includes configurations of each section, such as a control apparatus 2, and a sensor unit 3, a vehicle information input unit 4, an information presenting unit 5, an actuator 6, and the like that are connected to the control apparatus 2.

The control apparatus 2 is an information processing apparatus that is mainly configured by a central processing unit (CPU), a random access memory (RAM), a read-only memory (ROM), a semiconductor memory, an input/output interface, and the like (not shown). The control apparatus 2 corresponds to an object detection apparatus in the present disclosure. For example, the control apparatus 2 may be configured by a microcontroller in which functions as a computer system are integrated. The functions of the control apparatus 2 may be obtained by the CPU running a program that is stored in a non-transitory computer-readable storage medium, such as the ROM or the semiconductor memory. Here, the control apparatus 2 may be configured by a single microcontroller or a plurality of microcontrollers.

The sensor unit 3 includes a plurality of sensors that detect a state in a predetermined area in the periphery of the vehicle 1. According to the present embodiment, the sensor unit 3 includes a millimeter-wave radar 31, a laser radar 32, a sonar 33, and a camera 34. For example, the sensor unit 3 is arranged in the vehicle 1 so as to observe the state in the predetermined area that is at least any of ahead of, ahead and to the side of, to the side of, to the rear of, and to the rear and to the side of the vehicle 1. Alternatively, according to another embodiment, the sensor 3 may be configured by a single sensor.

The millimeter-wave radar 31 is an object sensor that detects an object by emitting millimeter-waveband detection waves to the periphery of the vehicle 1 and receiving reflected waves thereof. The laser radar 32 is an object sensor that detects an object by emitting laser light to the periphery of the vehicle 1 and receiving reflected light thereof. The sonar 33 is an object sensor that detects an object by emitting sonar waves to the periphery (surroundings) of the vehicle 1 and receiving reflected waves thereof.

The camera 34 is an imaging apparatus that captures an image of an area in the periphery of the vehicle 1. For example, the camera 34 may be configured by a stereo camera or a single-lens camera. The control apparatus 2 performs a known image recognition process on the image that is captured by the camera 34. The control apparatus 2 acquires information that indicates a distance to an object that is present in the periphery of the vehicle 1, a direction of the object, and distribution through the image recognition process.

The vehicle information input unit 4 inputs various types of information indicating a traveling state of the vehicle 1 to the control apparatus 2. According to the present embodiment, the information indicating the traveling state of the vehicle 1 is measurement values from sensors that measure vehicle speed, acceleration, steering angle, and the like.

The information presenting unit 5 is an output apparatus for notifying a driver of information. For example, the information presenting unit 5 includes a display apparatus and an audio output apparatus. The display apparatus presents visual information to the driver of the vehicle 1. The audio output apparatus presents information to the driver through sound. For example, the display apparatus may be configured by an onboard monitor, a head-up display, and an indicator. According to the present embodiment, the purpose of the information presenting unit 5 is to notify the driver of information related to the detection result of a target object that is present in the periphery of the vehicle 1. The information presenting unit 5 corresponds to an information output apparatus of the present disclosure.

The actuator 6 is an apparatus group that includes a driving system actuator that operates an accelerator and a transmission of the vehicle 1, a brake system actuator that operates a brake, and a steering system actuator that operates a steering apparatus. The control apparatus 2 performs a function for avoiding a collision with an obstacle by automatically controlling the traveling state of the vehicle 1 by performing driving operations, such as acceleration, steering, and braking, in place of the driver based on information acquired from various apparatuses that are mounted in the vehicle 1. The actuator 6 performs the driving operations such as acceleration, braking, and steering of the vehicle 1 based on commands from the control apparatus 2.

Figure 2:
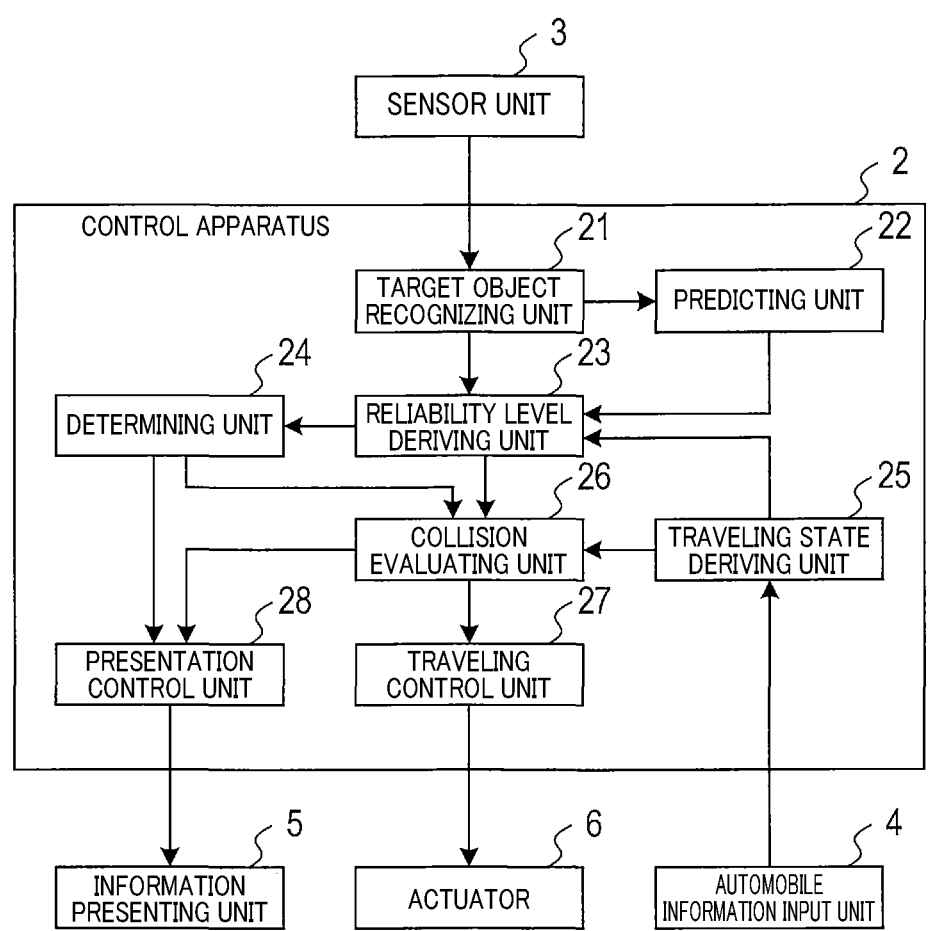
FIG. 2 is a block diagram of a functional configuration of a control apparatus.

As shown in an example in FIG. 2, the control apparatus 2 includes, as functional constituent elements, a target object recognizing unit 21, a predicting unit 22, a reliability level deriving unit 23, a determining unit 24, a traveling state deriving unit 25, a collision evaluating unit 26, a traveling control unit 27, and a presentation control unit 28. Here, a method for actualizing these elements that configure the functions of the control apparatus 2 is not limited to software. Some or all of the elements may be configured by hardware in which logic circuits, analog circuits, and the like are combined.

The target object recognizing unit 21 recognizes a target object such a vehicle that is present in the periphery of the vehicle 1 based on the information observed by the sensor unit 3. According to the present embodiment, position and speed of the target object are included as a state of the target object recognized by the target object recognizing unit 21. In addition, the target object recognizing unit 21 acquires sensor information that indicates the observation results from the sensor unit 3 at each fixed periodic observation timing, and recognizes the target object each time. In addition, in cases in which the sensor unit 3 includes a plurality of sensors, the target object recognizing unit 21 performs recognition of a target object based on the sensor information of each sensor.

The predicting unit 22 predicts the position and the speed of the target object at a next observation timing, based on a newest state of the target object that is recognized by the target object recognizing unit 21 at a newest observation timing. Specifically, the predicting unit 22 calculates transition amounts of the position and the speed of the target object at a time interval until the next observation timing, with reference to the observation values of the current position and speed of the target object. Based on the transition amounts of the position and the speed of the target object, the predicting unit 22 predicts the position and the speed at the next observation timing. In addition, the predicting unit 22 may predict the speed using acceleration that is observed from the target object.

The reliability level deriving unit 23 derives a reliability level that indicates a degree of certainty that the target object recognized by the target object recognizing unit 21 is actually present. Specifically, the reliability level deriving unit 23 derives a score that indicates the certainty of the recognition result of the target object at each observation timing. Then, with respect to target objects that have been recognized at a plurality of observation timings from past to present and can be considered to be the same, the reliability level deriving unit 23 statistically processes the scores at the plurality of observation timings. Based on the scores at the plurality of observation timings, the reliability level deriving unit 23 derives a cumulative reliability level related to the target object. Here, detailed steps for deriving the score and the reliability level will be described hereafter.

When the reliability level derived by the reliability level deriving unit 23 satisfies a predetermined reference, the determining unit 24 determines that the target object related to the reliability level is actually present. The traveling state deriving unit 25 derives the traveling state such as the current speed, acceleration, and steering angle of the vehicle 1 based on the information inputted from the vehicle information input unit 4. The traveling state deriving unit 25 corresponds to a movement information acquiring unit of the present disclosure.

The collision evaluating unit 26 evaluates a possibility of a collision between the vehicle 1 and the target object based on the reliability level of the target object derived by the reliability level deriving unit 23, the determination result of the target object by the determining unit 24, and the traveling state of the vehicle 1 derived by the traveling state deriving unit 25. The traveling control unit 27 controls each section of the actuator 6 to avoid a collision between the vehicle 1 and the target object based on the evaluation result from the collision evaluating unit 26. The traveling control unit 27 corresponds to a motion control unit of the present disclosure. The traveling control unit 27 determines operations such as acceleration, steering, and braking that are required to avoid a collision with the target object. In addition, the traveling control unit 27 controls the traveling state of the vehicle 1 by operating the accelerator, the steering apparatus, the brake, and the like based on the determined operations.

The presentation control unit 28 presents, to the driver through the information presenting unit 5, information related to the detection result of the target object based on the information related to the target object of which detection is determined by the determining unit 24 and the evaluation result from the collision evaluating unit 26.

[Description of the Detection Process]

Figure 3:
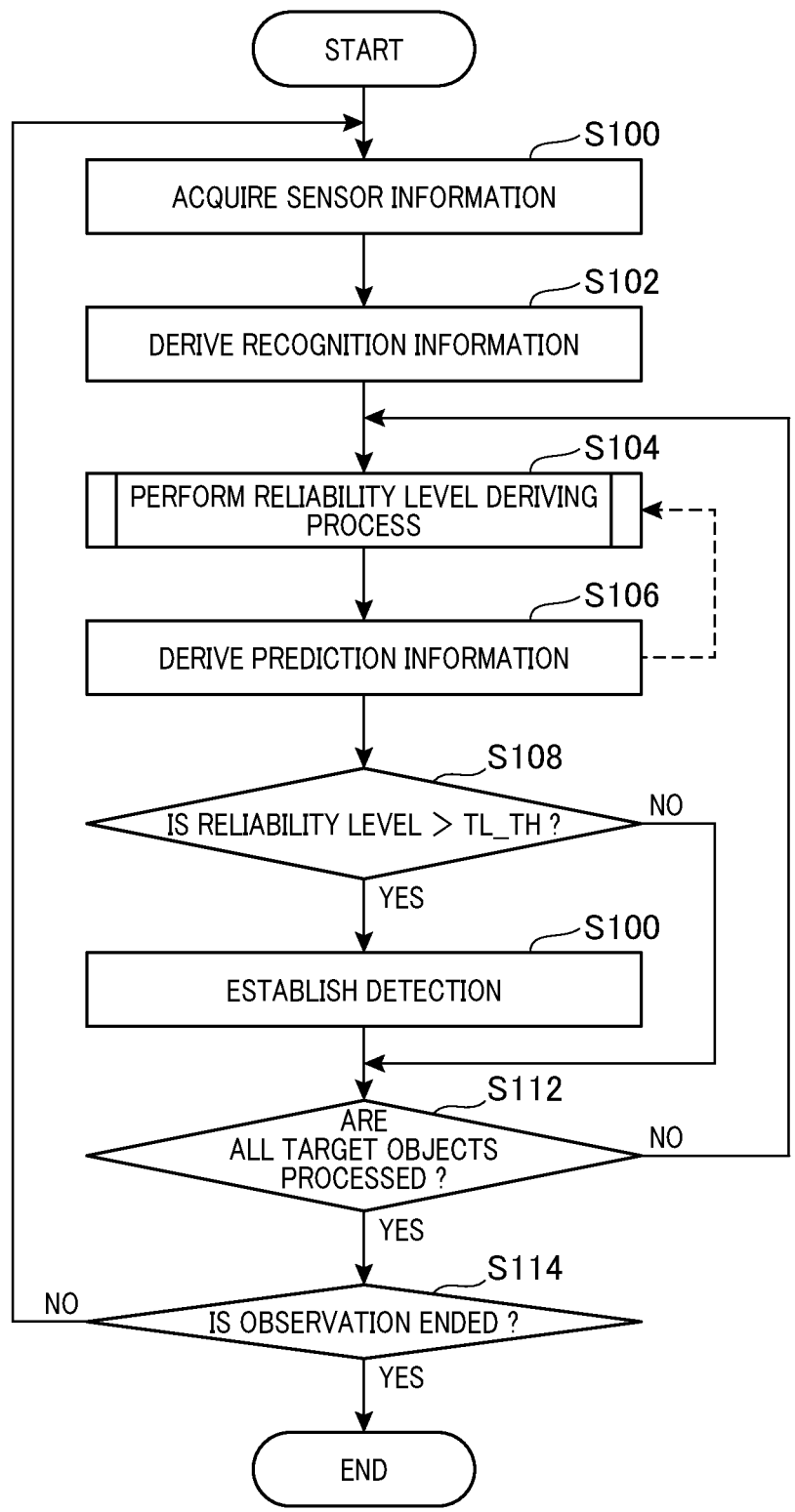
FIG. 3 is a flowchart of the steps in a detection process.

The steps in the detection process performed by the control apparatus 2 will be described with reference to a flowchart in FIG. 3. The control apparatus 2 repeatedly performs the detection process at a fixed periodic observation timing.

At step S100, the control apparatus 2 acquires sensor information that indicates the observation result from each sensor that configures the sensor unit 3. At step S100, the control apparatus 2 acquires the sensor information based on the periodic observation timing. For example, the sensor information that is acquired by the control apparatus 2 includes information acquired by the millimeter-wave radar 31, the laser radar 32, the sonar 33, and the camera 34. At step S102, the control apparatus 2 derives recognition information from the sensor information acquired at step S100. The recognition information indicates a state of a target object including at least presence/absence of a target object that can be recognized within a predetermined range in the periphery of the vehicle 1, the position of the target object, and the speed of the target object. Here, when the sensor unit 3 includes a plurality of sensors, the recognition information is derived from the sensor information of each sensor. The processes at steps S100 and S102 correspond to processes as the target object recognizing unit 21.

At step S104, the control apparatus 2 performs a reliability level deriving process of the target object that is indicated by the recognition information derived at step S102. Here, the control apparatus 2 derives the reliability level for a single unprocessed target object of which the reliability level is not yet derived, among at least one target object recognized at step S102. Hereafter, the target object to be subject to deriving of the reliability level is denoted as a subject target object. The process at step S104 corresponds to a process as the reliability level deriving unit 23. Here, detailed steps in the reliability level deriving process will be described hereafter.

At step S106, the control apparatus 2 predicts the states of the position and the speed of the subject target object at the next observation timing, with reference to the state of the subject target object observed at step S102 at the current observation timing. The process at S106 corresponds to a process as the predicting unit 22.

At step S108, the control apparatus 2 determines whether the reliability level of the subject target object derived at step S104 is greater than a threshold TL_TH. The threshold TL_TH is a threshold that serves as a reference for determining detection of a target object. When determined that the reliability level of the subject target object is equal to or less than the threshold TL_TH (NO at step S108), the control apparatus 2 shifts the process to S112 without determining the detection result of the subject target object.

Meanwhile, when determined that the reliability level of the subject target object is greater than the threshold TL_TH (YES at step S108), the control apparatus 2 shifts the process to step S110. At step S110, the control apparatus 2 considers the subject target object, corresponding to the reliability level of which the determination result is YES at step S108, to actually be present and determines the detection result. The control apparatus 2 registers information including the position, speed, score, reliability level, and the like of the determined subject target object as history information. The processes at S108 and S110 correspond to processes as the determining unit 24.

Here, when the sensor unit 3 includes a plurality of sensors, if target objects that can be considered to be the same are observed in multiplicate among the plurality of sensors, the reliability levels of the multiplicate target objects are integrated, and whether the target object is actually present is determined. For example, as a method for determining whether the target objects detected among a plurality of sensors can be considered to be the same, the positions and speeds of the target objects are compared. The target objects that have a high level of coincidence are determined to be the same target object.

At step S112, the control apparatus 2 determines whether the series of processes at steps S104 to S110 is completed for all of the target objects recognized at step S102. When an unprocessed target object remains (NO at step S112), the control apparatus 2 returns the process to step S104 and derives the reliability level of the next subject target object. Meanwhile, when determined that processing is completed for all target objects (YES at step S112), the control apparatus 2 shifts the process to step S114.

At step S114, the control apparatus 2 determines whether observation of the target object through the detection process is ended based on an external command. When determined that observation is not ended (NO at step S114), the control apparatus 2 returns the process to step S100. Meanwhile, when determined that observation is ended (YES at step S114), the control apparatus 2 ends the detection process.

[Description of the Reliability Level Deriving Process]

The steps in the reliability level deriving process performed by the control apparatus 2 will be described with reference to a flowchart in FIG. 4. The reliability level deriving process is a process that is performed at step S104 in the detection process shown in the example in FIG. 3.

At step S200, the control apparatus 2 determines a combination of the subject target object and a prediction target object that corresponds to the subject target object. The prediction target object referred to herein is a target object that is indicated by prediction information that is predicted in the process at step S106 at the previous observation timing. That is, the prediction target object that corresponds to the subject target object is a target object that is indicated by the prediction information that is predicted at the previous observation timing of the target objects that can be considered to be the same as the subject target object detected at the current observation timing. For example, the control apparatus 2 determines, as the corresponding combination, the subject target object and the prediction target object of which the position and the speed of the subject target object and the position and the speed of the prediction target object are closest within a predetermined allowable range.

At step S202, the control apparatus 2 calculates a difference Dr between the respective positions of the subject target object and the prediction target object corresponding to the combination determined at step S200. At step S204, the control apparatus 2 calculates a difference Dv between the respective speeds of the subject target object and the prediction target object corresponding to the combination determined at step S200.

At step S206, the control apparatus 2 sets a score distribution that is applied to the subject target object at the current observation timing. The score distribution is a distribution of scores that are assigned based on degrees of Dr and Dv. Here, a method for deriving a score based on the score distribution will be described as a premise. According to the present embodiment, the control apparatus 2 derives a score of the subject target object from the score distribution based on the magnitudes of Dr and Dv that are differences between the subject target object and the prediction target object. The control apparatus 2 derives a larger score as the values of Dr and Dv decrease and a smaller score as the values of Dr and Dv increase. The score may be configured such that the value changes in stages based on changes in the values of Dr and Dv. Alternatively, the score may be configured such that the value continuously changes based on the changes in the values of Dr and Dv.

Figures 5, 6:
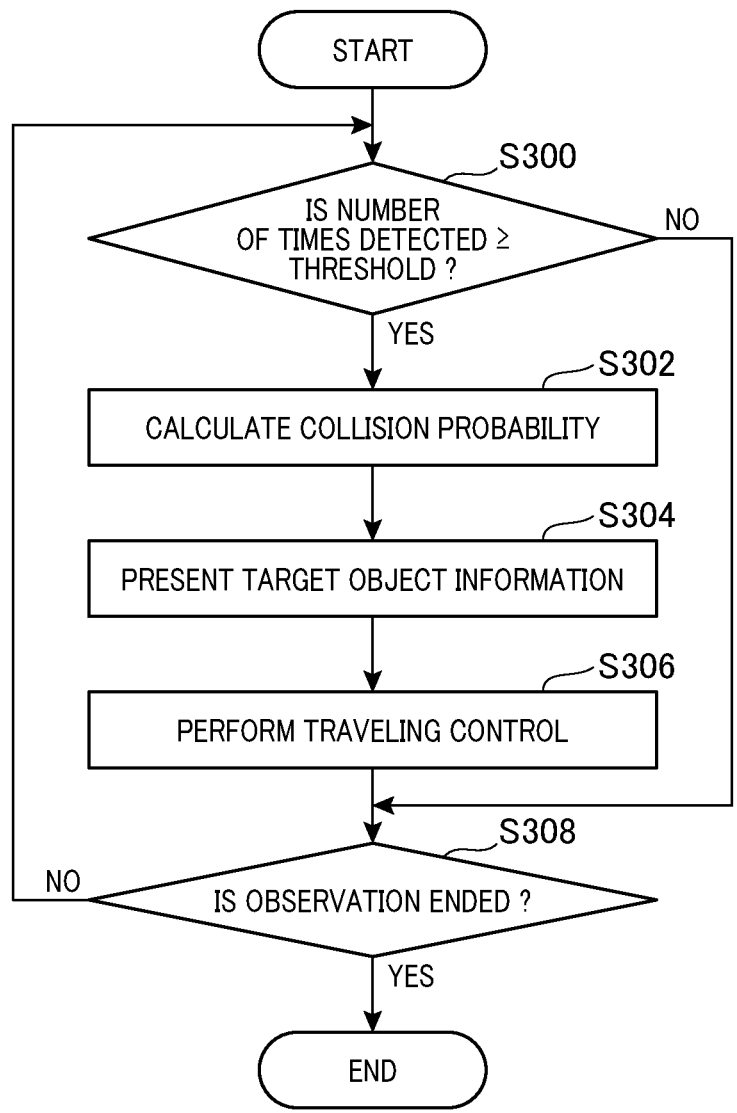
FIG. 5 is a flowchart of the steps in a collision avoiding process.
FIG. 6 is an example of a table defining a score distribution.

As a specific method by which the control apparatus 2 derives the score, as shown in an example in FIG. 6, an example is given in which a predetermined table that defines a relationship between a threshold that is a sum of Dr and Dv and the score is used as the score distribution. Alternatively, as shown in examples in FIG. 7 and FIG. 8, an example is given in which a predetermined graph that indicates the relationship between the threshold that is the sum of Dr and Dv and the score as a diagram is used as the score distribution. Alternatively, as shown in an example in FIG. 9, an example is given in which a function that expresses the relationship between Dr and Dv, and the score Sc is used as the score distribution. The control apparatus 2 may derive the score of the subject target object using any of the score distributions shown in the examples in FIG. 6 to FIG. 9, or may use yet another score distribution.

Figure 4:
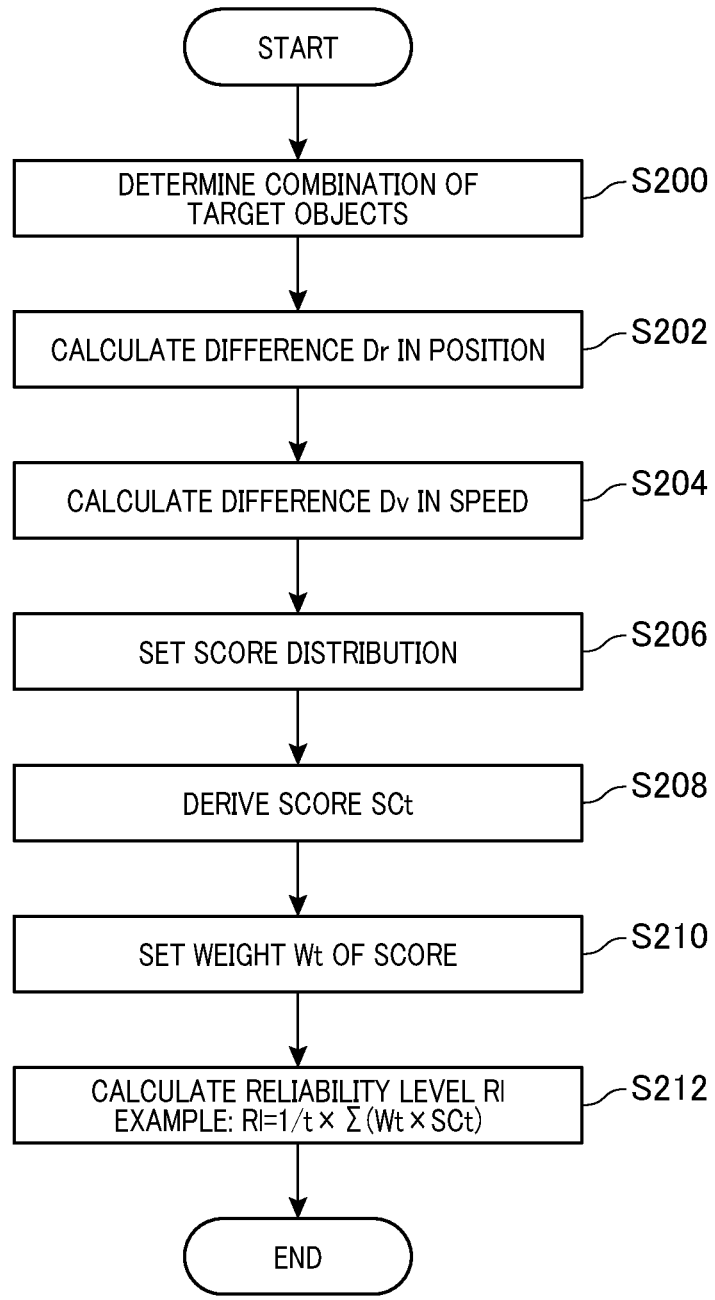
FIG. 4 is a flowchart of the steps in a reliability level deriving process.

Returning to the description of S206 in FIG. 4, the control apparatus 2 sets the score distribution applied at the current observation timing based on at least either of the state of the speed and position of the target object expressed by at least either of the recognition information and the prediction information related to the subject target object, and the traveling state of the vehicle 1. For example, the control apparatus 2 sets the score distribution such that the score that is assigned based on the degrees of Dr and Dv increases as the speed in a direction in which the target object moves towards the vehicle 1 increases. As a more specific operation, the control apparatus 2 may set the score distribution such that the score that is assigned based on the degrees of Dr and Dv increases as a relative speed of the target object that is moving in a direction orthogonal to a travelling direction of the vehicle 1 increases.

In addition, the control apparatus 2 may set the score distribution such that the score that is assigned based on the degrees of Dr and Dv increases as the position of the target object becomes farther from the vehicle 1. As a more specific operation, the control apparatus 2 may set the score distribution such that the score that is assigned based on the degrees of Dr and Dv increases as the distance of the target object in the direction orthogonal to the travelling direction of the vehicle 1 becomes farther. Alternatively, the control apparatus 2 may set the score distribution that the score that is assigned based on the degrees of Dr and Dv increases as the position of the target object becomes closer to a center of an observation range of each sensor configuring the sensor unit 3.

Figure 10:
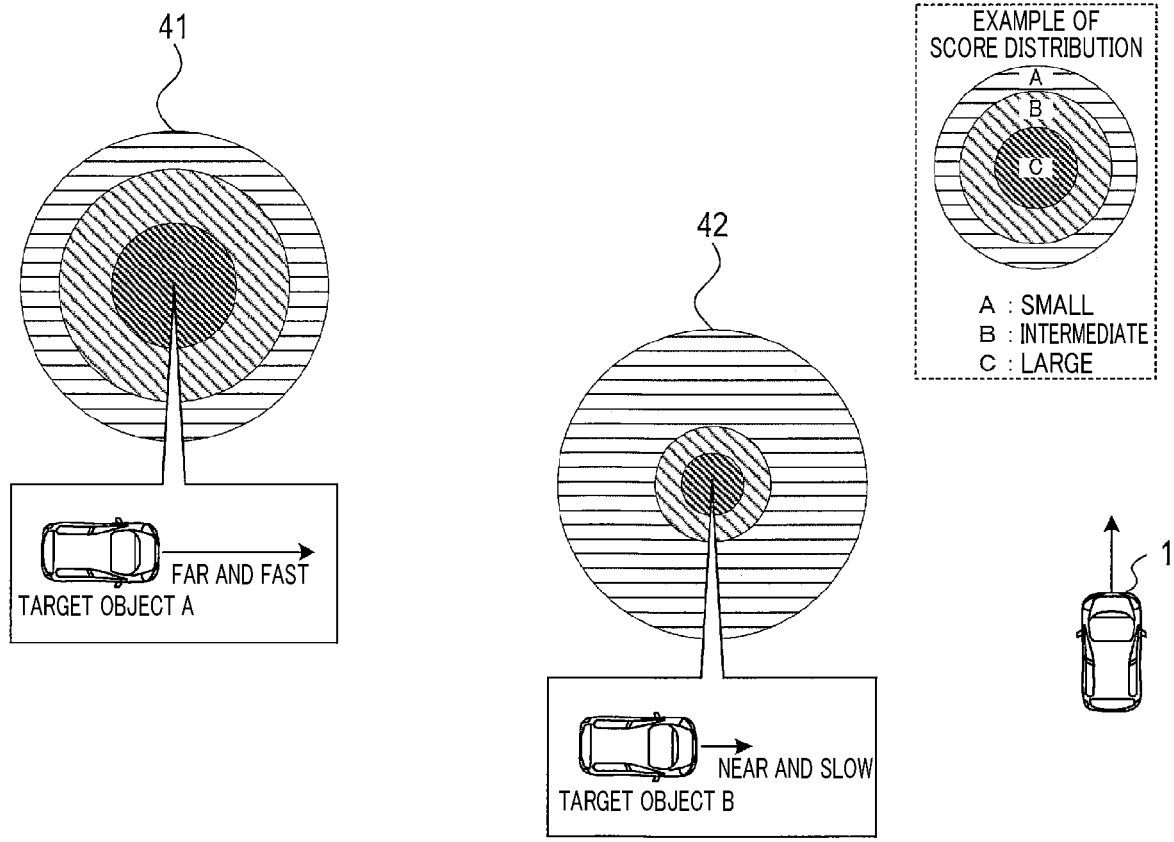
FIG. 10 is an explanatory diagram of a case in which the score distribution is variable.

A case in which the control apparatus 2 sets the score distribution based on the state will be described with reference to FIG. 10. The case in FIG. 10 shows a comparison between a score distribution 41 that set for a target object A and a score distribution 42 that is set for a target object B. Circles in the score distributions 41 and 42 indicate that a score that is closer to the center of the circle is assigned as the degrees of Dr and Dv decrease, and a score that is farther from the center of the circle is assigned as the degrees of Dr and Dv increase. As shown in the example in FIG. 10, the target object A is positioned in a location that is relatively far from the vehicle 1 and the speed is relatively high. In contrast, the target object B is positioned in a location that is relatively close to the vehicle 1 and the speed is relatively low. Therefore, in the case in FIG. 10, when the score distribution 41 and the score distribution 42 are compared, the score distribution 41 has a larger area that is occupied by high scores, and the score that is assigned based on the degrees of Dr and Dv increases.

Alternatively, the control apparatus 2 may set the score distribution based on the traveling state of the vehicle 1 that is indicated by the information acquired from the vehicle information input unit 4. As an example, the control apparatus 2 sets the score distribution such that the score that is assigned based on the degrees of Dr and Dv increases as the speed of the vehicle 1 decreases. As another idea, the control apparatus 2 may set the score distribution such that the score that is assigned based on the degrees of Dr and Dv increases as the speed of the vehicle 1 increases. Alternatively, the control apparatus 2 may increase the score at is assigned based on the degrees of Dr and Dv under a condition that the speed of the vehicle 1 is within a predetermined range.

In addition, the configuration may be such that the control apparatus 2 varies the score distribution based on the traveling state such as the operating states of the accelerator and the brake, the steering angle, acceleration, and the yaw rate, in addition to the speed. For example, the control apparatus 2 evaluating stability of the traveling state of the vehicle 1 based on the traveling state such as the operating states of the accelerator and the brake, the steering angle, acceleration, and the yaw rate, and setting the score distribution such that the score increases as the traveling state becomes further from a stable state can be considered. Here, when the score distribution of the various methods for deriving the score shown in the examples in FIG. 6 to FIG. 9 is variable, a configuration in which a value of a that is a parameter is changed based on the states of the target object and the vehicle 1 can be considered as an example.

Returning to the description of the flowchart in FIG. 4, at S208, the control apparatus 2 derives a score SCt of the subject target object at a current observation timing t. Specifically, the control apparatus 2 derives the score SCt by applying the values of Dr and Dv derived at steps S202 and S204 to the score distribution set at step S206.

At step S210, the control apparatus 2 sets a weight Wt for a series of scores of the subject target object from past to present. Specifically, the control apparatus 2 respectively sets the weight Wt for a time series of the scores SCt related to the target object that can be considered to be the same as the subject target object in a history of detection, from a past observation timing to the current observation timing. For example, the control apparatus 2 sets the weight Wt so as to increase the weight Wt in order from that of the newest observation timing. Alternatively, the control apparatus 2 may set the weight Wt so as to increase the weight Wt of only the most recent score.

At step S212, the control unit 2 derives a reliability level R1 of the subject target object by performing a statistical process using the time series of the series of scores of the subject target object from past to present, and the weight Wt set at step S210. Specifically, the control apparatus 2 calculates a weighted moving average of the series of scores of the subject target object from past to present as the reliability level R1. Alternatively, as another idea, the control apparatus 2 may calculate a weighted total of the series of scores of the subject target object from past to present as the reliability level R1.

[Description of a Collision Avoiding Process]

The steps in a collision avoiding process performed by the control apparatus 2 will be described with reference to a flowchart in FIG. 5. The control apparatus 2 performs the collision avoiding process in parallel with the detection process shown in the example in FIG. 3.

At step S300, the control apparatus 2 determines whether a number of times that the detection result is determined for each target object, of which the detection result is determined as the target object actually being present, has reached a predetermined threshold or greater. Here, the threshold is a requisite that is related to a timing at which traveling control to avoid a collision between the vehicle 1 and the target object is started. According to the present embodiment, the traveling control for avoiding a collision with the target object is performed under a condition that the number of times that the target object is determined is equal to or greater than the threshold.

In addition, the control apparatus 2 may vary the threshold based on the degree of at least either of the score and the reliability level related to the target object. For example, the control apparatus 2 increases the threshold as the score or the reliability level related to the target object decreases.

When determined that no target objects of which the number of times that the detection result is determined is equal to or greater than the threshold are present at step S300 (NO at step S300), the control apparatus 2 shifts the process to step S308. Meanwhile, when determined that the number of times that the detection result is determined is equal to or greater than the threshold for any of the target objects (YES at step S300), the control apparatus 2 shifts the process to S302.

At step S302, the control apparatus 2 calculates a collision probability of the target object (referred to, hereafter, as a determined target object) of which the number of times that the detection result is determined is equal to or greater than the threshold. The collision probability is a value that evaluates a likelihood of a collision with the vehicle 1. For example, the control apparatus 2 calculates the collision probability based on predicted courses of the determined target object and the vehicle 1, the distance and relative speed between the determined target object and the vehicle 1, and the like. The process at S302 corresponds to a process as the collision evaluating unit 26.

At step S304, the control apparatus 2 presents target object information through the information presenting unit 5, based on the collision probability calculated at step S302. The target object information includes information related to the detection result of the determined target object based on the collision probability calculated at step S302 via the information presenting unit 5. The process at step S304 corresponds to a process as the presentation control unit 28. Specifically, the control apparatus 2 outputs, as the target object information, image information and audio information of which the content alerts the driver regarding the determined target object of which the collision probability exceeds the predetermined threshold and is high.

When presenting the target object information, the control apparatus 2 may vary the aspect in which target object information is presented based on at least either of the score and the reliability level of the determined target object to be subject to information presentation. Specifically, the control apparatus 2 expresses the score distribution or the reliability level of the determined target object through a numeric value, a diagram, flashing of an indicator, sound volume, or the like.

Alternatively, the control apparatus 2 may express the score distribution or the reliability level of the determined target object through changes in color, shade of color, transmissivity, and contrast in an image. As a result of the display aspect of the target object information being made variable based on the score and the reliability level of the target object in this manner, the driver of the vehicle 1 can intuitively ascertain the score and the reliability level of the target object.

Figure 11:
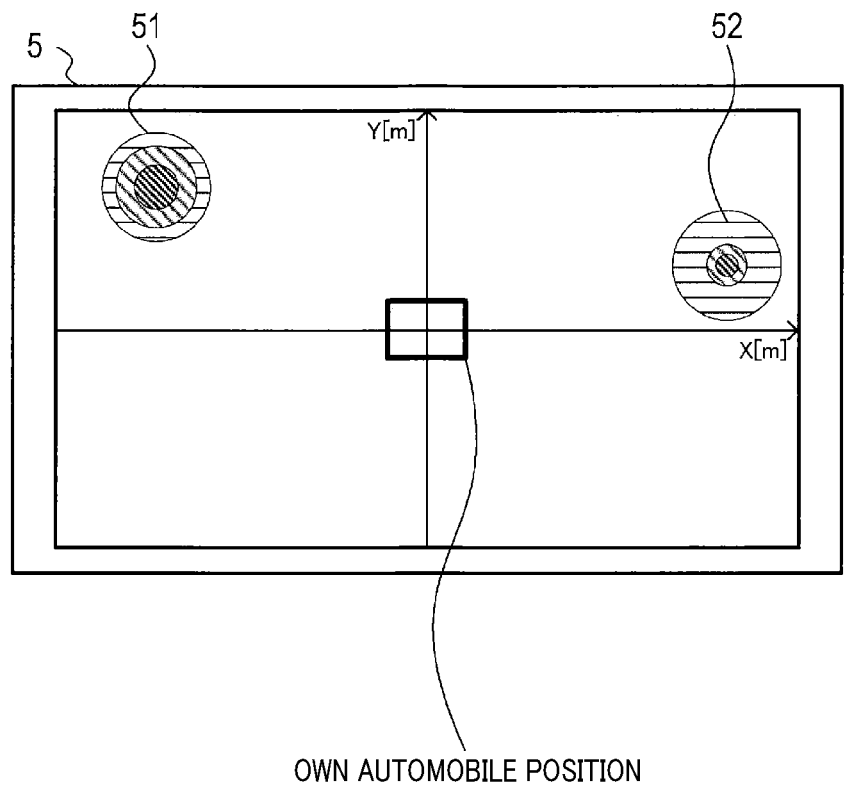
FIG. 11 is a diagram of a display example of target object information.

FIG. 11 is a display example of the target object information on a monitor or the like that is set in an instrument panel or the like of the vehicle 1. In the case in FIG. 11, with reference to the position of the own vehicle that is set in a center of a screen, images 51 and 52 that indicate the score distributions related to the determined target objects are displayed in the positions corresponding to the detected determined target objects.

Figure 12:
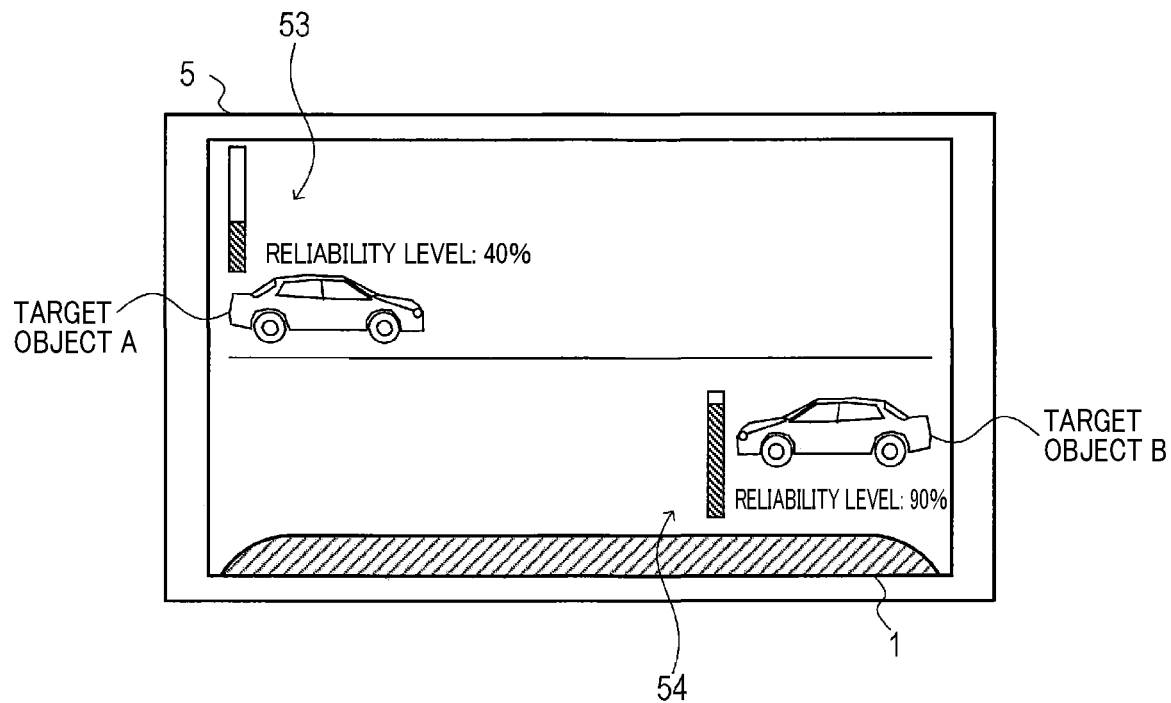
FIG. 12 is a diagram of a display example of target object information.

In addition, FIG. 12 is a display example of the target object information on a head-up display that is provided in the vehicle 1. The head-up display displays information ahead of the line of sight of the driver of the vehicle by forming a display image by a virtual image in the front visual field of the driver. In the case in FIG. 12, target object information 53 and 54 that include numeric values and graphs indicating the reliability levels of the determined target objects are displayed near the target objects A and B in the front visual field of the driver.

Returning to the description of the flowchart in FIG. 5, at step S306, the control apparatus 2 performs the traveling control to avoid a collision with the determined target object based on the collision probability calculated at step S302. The process at step S306 corresponds to a process as the traveling control unit 27.

Specifically, the control apparatus 2 suppresses the speed of the vehicle 1 by controlling the actuators of the driving system and the brake system, and adjusts the travelling direction of the vehicle 1 by controlling the actuator of the steering system, to avoid a collision with the determined target object of which the collision probability exceeds the predetermined threshold and is high. In addition, the control apparatus 2 may issue a warning to the driver through display or audio, when the traveling control for collision avoidance is performed.

Here, at step S306, the control apparatus 2 may vary the content of the travelling control for collision avoidance based on the degrees of the score and the reliability level related to the determined target object of which the collision probability is high. For example, the timing at which an avoidance operation such as braking or a warning is started may be made earlier or a degree of the avoidance operation or the warning may be intensified as the score or the reliability level of the determined target object increases.

At step S308, the control apparatus 2 determines whether observation of the target object is ended based on an external command. When determined that observation is not ended (NO at step S308), the control apparatus 2 returns the process to step S300. Meanwhile, when determined that observation is ended (YES at step S308), the control apparatus 2 ends the collision avoiding process.

Effects

In the onboard system according to the embodiment, the following effects are achieved. Based on the statistics of the scores that evaluate the observation results taken a plurality of times regarding the target object from past to present, the reliability level that indicates the certainty that the observed target object is actually present can be derived. Therefore, uncertainty attributed to variations in the observation result at each observation timing is suppressed. As a result, the detection result of the target object can be early determined and accuracy of the determination can be improved.

Figure 13:
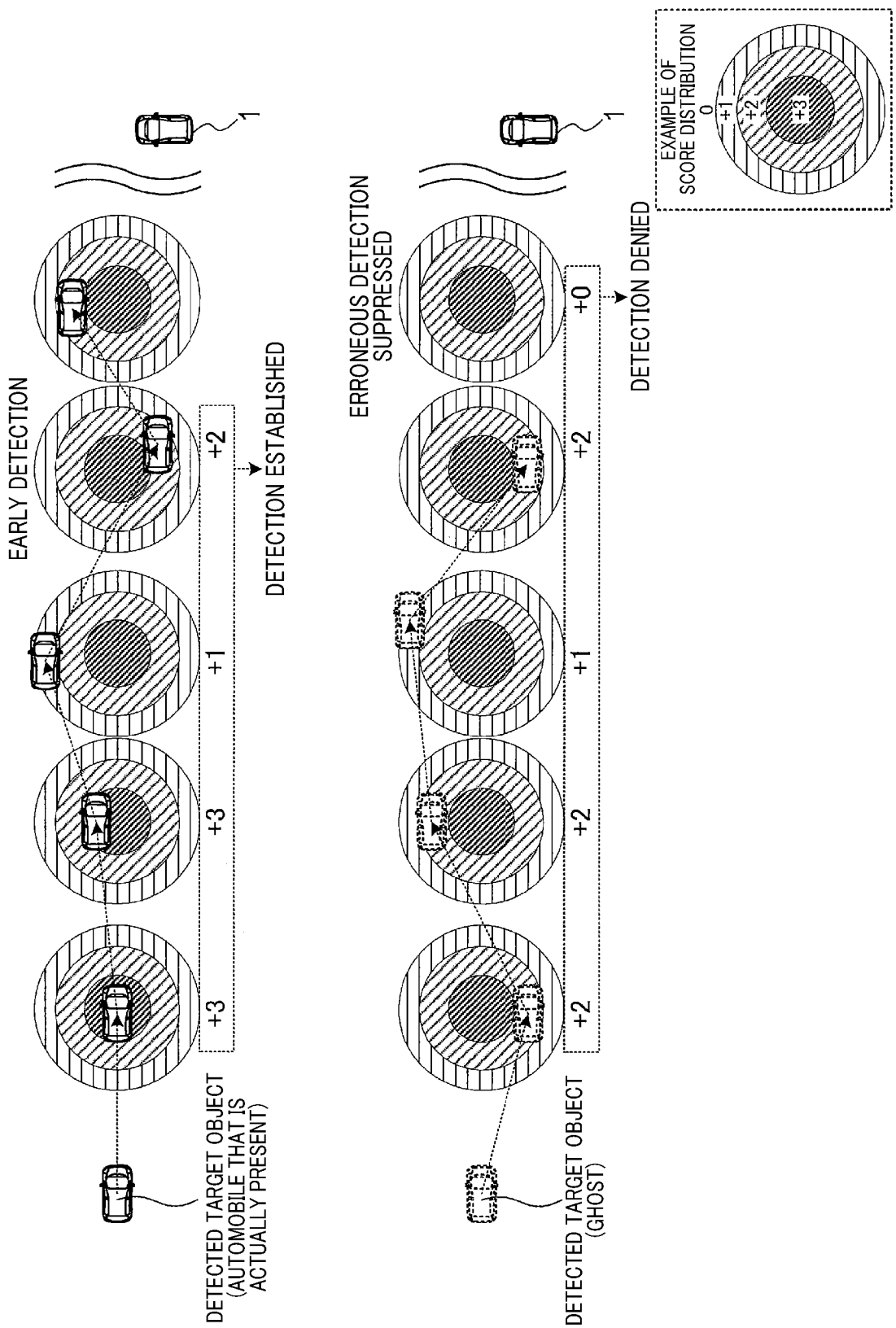
FIG. 13 is a diagram schematically showing an example of a process for determining detection of a target object.

Regarding the above-described effect, a description will be added with reference to FIG. 13. In a process of the detection of a target object shown in an example in FIG. 13, a premise that the control apparatus 2 determines that the target object is actually present when the total of the scores of the target object reaches a threshold (such as nine points) is set. In addition, to simplify the description, weighting of the score at each observation timing is not taken into consideration.

An upper row in FIG. 13 shows transitions in the detection result of a target object detected based on a vehicle that is actually present. The target object that is detected based on a vehicle that is actually present is detected without significant deviation from the position and the speed that can be predicted from the past observation results, and a relatively high score tends to be derived. Therefore, even if slight variations are present among individual scores, the total of the scores reaches the threshold at an early stage. Therefore, the detection result of the target object can be determined at an early stage.

Meanwhile, a lower row in FIG. 13 shows transitions in the detection results of a false target object that is detected based on a ghost is produced as a result of detection waves from a sensor being propagated over multiple paths, or the like. The false target object based on a ghost or the like is detected when a reception state of the sensor is in an unstable state. Therefore, the false target object may be detected with significant difference from the position and the speed that can be predicted from the past observation results. Therefore, a relatively low score tends to be derived. The total of the scores does not reach the threshold, and erroneous error is suppressed.

In addition, the control apparatus 2 can vary the distribution of the scores given to the target object, based on the states of the position and the speed of the target object, and the traveling state of the vehicle 1. As a result of the score distribution being set to be high, determination of the detection of the target object can be made earlier. Meanwhile, as a result of the score distribution being set to be low, the accuracy of determination of the detection of the target object can be improved. That is, an operation in which the score distribution is set to be high in a state in which early detection of the target object is considered important, and the score distribution is set to be low in a state in which the accuracy of the detection is considered important is effective.

Furthermore, the control apparatus 2 can vary the aspect of the traveling control for avoiding a collision with a target object based on the score or the reliability level of the target object of which the detection is determined. As a result, the control apparatus 2 can perform the traveling control of the vehicle 1 according to an appropriate aspect based on the certainty of the detection result.

Variation Examples

A function provided by a single constituent element according to the above-described embodiments may be divided among a plurality of constituent elements. Functions provided by a plurality of constituent elements may be provided by a single constituent element. In addition, a part of a configuration according to the above-described embodiments may be omitted. Furthermore, at least a part of a configuration according to an above-described embodiment may be added to or replace a configuration according to another of the above-described embodiments. Any mode included in the technical concept specified by the wordings of the scope of claims is an embodiment of the present disclosure.

As a further modification that is applicable to the above-described embodiment, for example, a configuration in which a timing at which the traveling control for avoiding a collision between the vehicle 1 and the target object is started is presented to the driver through the information presenting unit 4 may be provided. In addition, as another modification that is applicable to the above-described embodiment, when setting the score distribution at S206 in the reliability level deriving process (see FIG. 4), the control apparatus 2 predicts the travelling direction of the target object based on a speed vector of the target object. The control apparatus 2 may set the score distribution such that the assigned score increases along the predicted travelling direction of the target object. Specifically, as shown in examples by reference signs 43 and 44 in FIG. 14, the control apparatus 2 sets the score distribution as an elliptical area in which the predicted travelling direction of the target object is a long diameter and a direction orthogonal to the predicted travelling direction is a short diameter.

According to the above-described embodiment, a case in which the object detection apparatus of the present disclosure is applied to a vehicle that travels on a road is described. The object detection apparatus of the present disclosure is not limited thereto and can be applied to a moving body other than the vehicle.

The present disclosure can also be implemented according to various embodiments such as a system of which the above-described control apparatus 2 is a constituent element, a program for enabling a computer to function as the control apparatus 2, a tangible recording medium such as a semiconductor memory in which the program is recorded, or an object detection method.

What is claimed is:

1. An object detection apparatus that detects a target object that is present in a periphery of a moving body, the object detection apparatus comprising:
a processor;
a non-transitory computer-readable storage medium; and
a set of computer-executable instructions stored on the non-transitory computer-readable storage medium that cause the processor to:
acquire sensor information that indicates an observation result from at least one sensor that observes a state in a predetermined area in the periphery of the moving body, at each fixed periodic observation timing;
derive recognition information that indicates a state that includes at least either of a position and a speed of a target object that can be recognized from the sensor information;
predict a state that includes at least either of the position and the speed of the target object at a second observation timing that follows a first observation timing, based on the recognition information that is derived based on the sensor information acquired at the first observation timing;
derive a score that indicates a degree of certainty of the detection result of the target object at the second observation timing, based on a degree of difference between the state of the target object indicated by the recognition information that is derived based on the sensor information acquired at the second observation timing and the state of the target object indicated by the prediction information related to the second observation timing that is derived from the recognition information at the first observation timing, and varies a distribution of the scores that are assigned based on the degree of difference based on the speed or the position of the target object that is indicated in at least either of the recognition information and the prediction information;
derive a reliability level that indicates a degree of certainty that target objects, which are recognized a plurality of observation timings from past to present and can be considered to be the same, are actually present, by statistically processing the scores related to the target object that are derived at the plurality of observation timings; and
determine, in response to the reliability level that is derived satisfying a predetermined reference, that the target object related to the reliability level is actually present, wherein:
the distribution of the scores that are assigned based on the degree of difference is varied such that the score increases as the speed of the target object in a direction towards the moving body increases.

2. The object detection apparatus according to claim 1, wherein the set of computer-executable instructions further cause the processor to
vary the distribution of the scores that are assigned based on the degree of difference such that the score increases as the position of the target object becomes closer to a center of an observation area of the sensor.

3. The object detection apparatus according to claim 1, wherein the set of computer-executable instructions further cause the processor to
vary the distribution of the scores that are assigned based on the degree of difference such that the score increases as a relative speed of the target object moving in a direction orthogonal to a travelling direction of the moving body increases.

4. The object detection apparatus according to claim 1, wherein the set of computer-executable instructions further cause the processor to
statistically process the scores so as to increase weight as the score becomes newer in observation timing.

5. The object detection apparatus according to claim 1, wherein the set of computer-executable instructions further cause the processor to
acquire movement information indicating a moving state of the moving body, wherein
the distribution of the scores that are assigned based on the degree of difference is varied based on the moving state indicated by the movement information.

6. The object detection apparatus according to claim 5, wherein the set of computer-executable instructions further cause the processor to
acquire information indicating a speed of the moving body as the movement information, wherein
the distribution of the scores that are assigned based on the degree of difference is varied based on the speed that is indicated in the movement information.

7. The object detection apparatus according to claim 1, wherein the set of computer-executable instructions further cause the processor to
present target object information that includes information related to the detection result of the target object that is determined through an information output apparatus that is provided in the moving body, wherein
an aspect in which the target object information related to the target object is presented is varied based on at least either of the score and the reliability level related to the target object.

8. The object detection apparatus according to claim 7, wherein the set of computer-executable instructions further cause the processor to
evaluate a likelihood of a collision between the target object that determined and the moving body; and
control motion of the moving body to avoid a collision with the target object based on an evaluation result of the likelihood of a collision, wherein
control content for avoiding a collision with the target object is varied based on at least either of the score and the reliability level of the target object.

9. The object detection apparatus according to claim 8, wherein the set of computer-executable instructions further cause the processor to
vary a requisite related to a timing at which control for avoiding a collision with the target object is started, based on at least either of the score and the reliability level of the target object.

10. The object detection apparatus according to claim 9, wherein the set of computer-executable instructions further cause the processor to
present information related to the timing at which the control for avoiding a collision with the target object is started.

11. The object detection apparatus according to claim 1, wherein:
the at least one sensor includes a plurality of sensors; and
the recognition information, the prediction information, the score, and the reliability level are derived based on respective observation results of the plurality of sensors; and
wherein the set of computer-executable instructions further cause the processor to
integrate, in response to target objects that can be considered to be the same being observed in multiplicate among the plurality of sensors, the reliability levels of the plurality of target objects related to the plurality of sensors and determine whether the target object is actually present.

12. An object detection apparatus that detects a target object that is present in a periphery of a moving body, the object detection apparatus comprising:
a processor;
a non-transitory computer-readable storage medium; and
a set of computer-executable instructions stored on the non-transitory computer-readable storage medium that cause the processor to:
acquire sensor information that indicates an observation result from at least one sensor that observes a state in a predetermined area in the periphery of the moving body, at each fixed periodic observation timing;
derive recognition information that indicates a state that includes at least either of a position and a speed of a target object that can be recognized from the sensor information;
predict a state that includes at least either of the position and the speed of the target object at a second observation timing that follows a first observation timing, based on the recognition information that is derived based on the sensor information acquired at the first observation timing;
derive a score that indicates a degree of certainty of the detection result of the target object at the second observation timing, based on a degree of difference between the state of the target object indicated by the recognition information derived based on the sensor information acquired at the second observation timing and the state of the target object indicated by the prediction information related to the second observation timing that is derived from the recognition information at the first observation timing, and varies a distribution of the scores that are assigned based on the degree of difference based on the speed or the position of the target object that is indicated in at least either of the recognition information and the prediction information; and
derive a reliability level that indicates a degree of certainty that target objects, which are recognized at a plurality of observation timings from past to present and can be considered to be the same, are actually present, by statistically processing the scores related to the target object that are derived at the plurality of observation timings; and
determine, in response to the reliability level that is derived satisfying a predetermined reference, that the target object related to the reliability level is actually present, wherein:
the distribution of the scores that are assigned based on the degree of difference is varied such that the score increases as the position of the target object becomes farther from the moving body.

13. The object detection apparatus according to claim 12, wherein the set of computer-executable instructions further cause the processor to
vary the distribution of the scores that are assigned based on the degree of difference such that the score increases as the distance of the target object in a direction orthogonal to the travelling direction of the moving body becomes farther.

14. The object detection apparatus according to claim 12, wherein the set of computer-executable instructions further cause the processor to
vary the distribution of the scores that are assigned based on the degree of difference such that the score increases as the position of the target object becomes closer to a center of an observation area of the sensor.

15. The object detection apparatus according to claim 12, wherein the set of computer-executable instructions further cause the processor to
statistically process the scores so as to increase weight as the score becomes newer in observation timing.

16. The object detection apparatus according to claim 12, wherein the set of computer-executable instructions further cause the processor to acquire movement information indicating a moving state of the moving body, wherein the distribution of the scores that are assigned is varied based on the degree of difference based on the moving state indicated by the movement information.

17. The object detection apparatus according to claim 12, wherein the set of computer-executable instructions further cause the processor to present target object information that includes information related to the detection result of the target object that is determined through an information output apparatus that is provided in the moving body, and wherein an aspect in which the target object information related to the target object is presented is varied based on at least either of the score and the reliability level related to the target object.

18. The object detection apparatus according to claim 12, wherein the at least one sensor includes a plurality of sensors;

the recognition information, the prediction information, the score, and the reliability level are derived based on respective observation results of the plurality of sensors, and wherein the set of computer-executable instructions further cause the processor to integrate, in response to target objects that can be considered to be the same being observed in multiplicate among the plurality of sensors, the reliability levels of the plurality of target objects related to the plurality of sensors and determines whether the target object is actually present.

* * * * *